(12) United States Patent
Ceccarelli et al.

(10) Patent No.: US 10,728,141 B2
(45) Date of Patent: Jul. 28, 2020

(54) APPARATUS AND METHOD FOR SEGMENT ROUTING

(71) Applicant: Telefonaktiebolaget LM Ericsson (publ), Stockholm (SE)

(72) Inventors: Daniele Ceccarelli, Sollentuna (SE); Diego Caviglia, Savona (IT); Gianluca Lombardi, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 8 days.

(21) Appl. No.: 15/736,194

(22) PCT Filed: Jun. 16, 2015

(86) PCT No.: PCT/SE2015/050709
§ 371 (c)(1),
(2) Date: Dec. 13, 2017

(87) PCT Pub. No.: WO2016/204662
PCT Pub. Date: Dec. 22, 2016

(65) Prior Publication Data
US 2018/0198706 A1 Jul. 12, 2018

(51) Int. Cl.
*H04L 12/723* (2013.01)
*H04L 12/751* (2013.01)
(Continued)

(52) U.S. Cl.
CPC .............. *H04L 45/50* (2013.01); *H04L 45/02* (2013.01); *H04L 45/04* (2013.01); *H04L 45/42* (2013.01); *H04L 45/62* (2013.01); *H04L 45/741* (2013.01)

(58) Field of Classification Search
CPC ......... H04L 45/50; H04L 45/42; H04L 45/02; H04L 45/04; H04L 45/62; H04L 45/741
See application file for complete search history.

(56) References Cited

U.S. PATENT DOCUMENTS 6,111,881 A  8/2000  Soncodi
6,148,000 A  11/2000  Feldman et al.
(Continued)

FOREIGN PATENT DOCUMENTS

EP  1881643 A1  1/2008
WO  2013021304 A1  2/2013

OTHER PUBLICATIONS

Filsfils, Clarence, et al., "Segment Routing Architecture: draft-ietf-spring-segment-routing-03," Network Working Group Internet-Draft, Internet Engineering Task Force (IETF) Specification, https://tools.ietf.org/html/draft-ietf-spring-segment-routing-03, May 28, 2015, 19 pages.

(Continued)

*Primary Examiner* — Ian N Moore
*Assistant Examiner* — Rushil Parimal Sampat
(74) *Attorney, Agent, or Firm* — Patent Portfolio Builders, PLLC

(57) ABSTRACT

A method in a controller node for performing segment routing in a non-packet data network comprising a plurality of nodes, comprises receiving information relating to the topology of the non-packet data network connecting the plurality of nodes, the non-packet data network forming a data plane network. The method comprises computing a segment routing path to be taken for non-packet traffic data through the data plane network, wherein the segment routing path is computed using segment identifiers, SIDs, relating to a data communication network, DCN, coupled to the plurality of nodes. The method comprises sending the computed segment routing path to an ingress node of the data plane network.

18 Claims, 9 Drawing Sheets

(51) Int. Cl.
*H04L 12/717* (2013.01)
*H04L 12/715* (2013.01)
*H04L 12/749* (2013.01)
*H04L 12/721* (2013.01)

(56) References Cited

U.S. PATENT DOCUMENTS

| | | | |
|---|---|---|---|
| 8,918,631 B1 * | 12/2014 | Kumar | H04L 12/4641 |
| | | | 370/254 |
| 9,450,864 B2 * | 9/2016 | Zhao | H04L 45/42 |
| 9,503,363 B2 * | 11/2016 | Sivabalan | H04L 45/50 |
| 9,537,753 B2 * | 1/2017 | Alvarez | H04L 41/0803 |
| 9,660,897 B1 * | 5/2017 | Gredler | H04L 45/50 |
| 2010/0020797 A1 | 1/2010 | Casey et al. | |
| 2013/0195111 A1 | 8/2013 | Allan et al. | |
| 2014/0112188 A1 | 4/2014 | Keesara et al. | |
| 2014/0169370 A1 * | 6/2014 | Filsfils | H04L 69/166 |
| | | | 370/392 |
| 2014/0321323 A1 | 10/2014 | Fedyk | |

OTHER PUBLICATIONS

International Search Report and Written Opinion for International Patent Application No. PCT/SE2015/050709, dated Jun. 13, 2016, 20 pages.

\* cited by examiner

APPARATUS AND METHOD FOR SEGMENT ROUTING

This application is a 35 U.S.C. § 371 national phase filing of International Application No. PCT/SE2015/050709, filed Jun. 16, 2015, the disclosure of which is incorporated herein by reference in its entirety.

TECHNICAL FIELD

The present disclosure relates to an apparatus and method for segment routing, and in particular to an apparatus and method for performing segment routing in a non-packet data network comprising a plurality of nodes.

BACKGROUND

Segment Routing is a network technology that provides enhanced packet forwarding behaviour while minimizing the need for maintaining awareness of mass volumes of network states.

It is commonly used for application-enabled routing in software defined networks as it has the ability to provide strict network performance guarantees, efficient use of network resources and very high scalability for application-based transactions.

Segment routing technology has been defined for Multi Protocol Label Switching (MPLS) and Internet Protocol version 6 (IPv6) data planes.

In contrast, at present, non-packet transport networks such as optical networks are typically controlled based on fully distributed Generalized MPLS (GMPLS) control panes or a fully centralized control plane, for example an Open Flow based Software Defined Networking (SDN) solution.

However, fully centralized solutions are highly dependent on the availability and connectivity of an SDN controller and often have low performance in terms of scalability and resiliency.

Furthermore, fully distributed GMPLS control planes rely on signalling protocols, which implies a high effort in terms of the configuration maintenance and management complexity of the control plane. Also, as this is as stateful approach a periodic update is required.

SUMMARY

According to a first aspect there is provided a method in a controller node for performing segment routing in a non-packet data network comprising a plurality of nodes. The method comprises receiving information relating to the topology of the non-packet data network connecting the plurality of nodes, the non-packet data network forming a data plane network. The method comprises computing a segment routing path to be taken for non-packet traffic data through the data plane network, wherein the segment routing path is computed using segment identifiers, SIDs, relating to a data communication network, DCN, coupled to the plurality of nodes. The method comprises sending the computed segment routing path to an ingress node of the data plane network.

According to another aspect, there is provided a method for performing segment routing in a network node, the network node forming part of a non-packet data network comprising a plurality of nodes. The method comprises receiving segment routing path information, the segment routing path information identifying a path through a data communication network, DCN, connecting the plurality of nodes. The method comprises mapping the segment routing path information to a data plane network connecting the plurality of nodes. The method comprises computing a path in the data plane network using the segment routing path information.

According to another aspect there is provided a controller node for performing segment routing in a non-packet data network comprising a plurality of nodes, the controller node comprising a processor and a memory, said memory containing instructions executable by said processor. The controller node is operative to receive information relating to the topology of the non-packet data network connecting the plurality of nodes, the non-packet network forming a data plane network. The controller node is further operative to compute a segment routing path to be taken for non-packet traffic data through the data plane network, wherein the segment routing path is computed using segment identifiers, SIDs, relating to a data communication network, DCN, coupled to the plurality of nodes. The controller node is further operative to send the computed segment routing path to an ingress node of the data plane network.

According to another aspect, there is provided a network node for performing segment routing, the network node forming part of a non-packet data network comprising a plurality of nodes, the network node comprising a processor and a memory, said memory containing instructions executable by said processor. The network node is operative to receive segment routing path information, the segment routing path information identifying a path through a data communication network, DCN, connecting the plurality of nodes. The network node is further operative to map the segment routing path information to a data plane network connecting the plurality of nodes. The network node is further operative to compute a path in the data plane network using the segment routing path information.

According to another aspect, there is provided a computer program product having computer readable code embodied therein, the computer readable code being configured such that, on execution by a suitable computer or processor, the computer or processor performs the method as defined in the appended claims.

BRIEF DESCRIPTION OF DRAWINGS

For a better understanding of the present invention, and to show how it may be put into effect, reference will now be made, by way of example, to the accompanying drawings, in which.

DETAILED DESCRIPTION

Figure 1A:
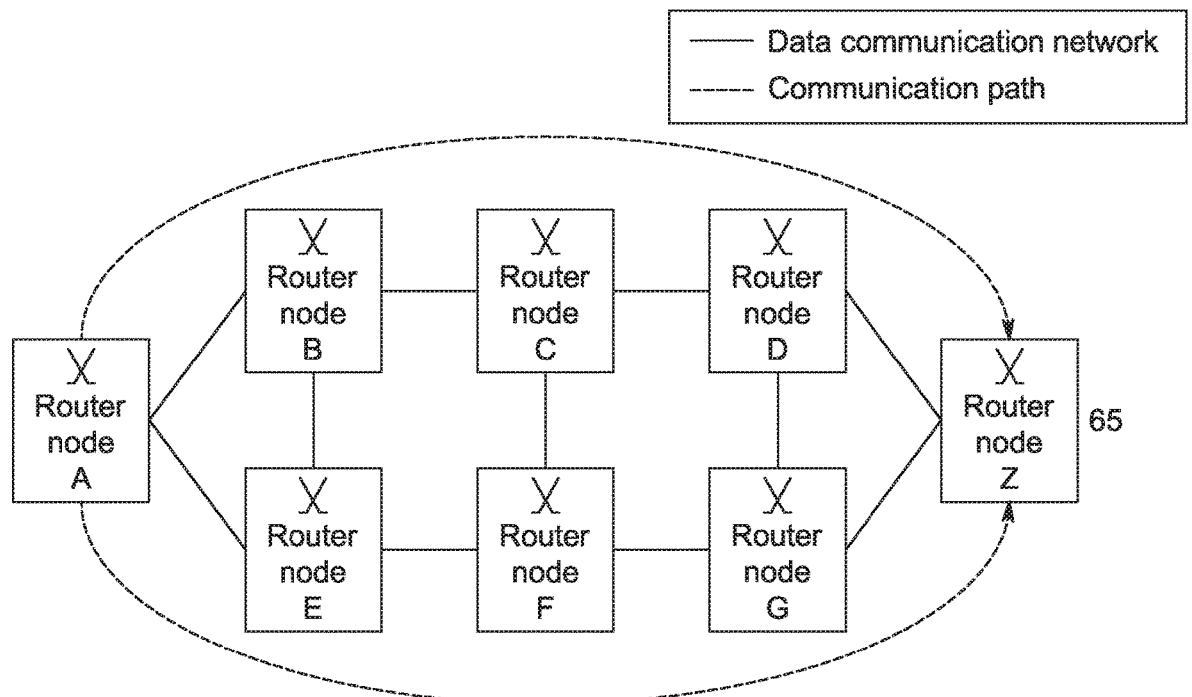
FIG. 1A illustrates an example of a node segment in segment routing.

FIG. 1A illustrates an example of a node segment in segment routing. The nodes labelled A-Z are connected by a data communication network. In this example, a packet is injected into the network at node A with the active segment "65". This indicates the node Z. Previously the node Z will have advertised its global node segment (i.e. 65), and all remote nodes A to G will have installed the node segment to Z in the segment routing data plane along the shortest path to Z. Thus, when a packet is injected anywhere in the network with an active segment 65 (such as into node A as shown in the example), the packet can then use Equal Cost Multipath (ECMP) to compute the shortest path between the nodes A and Z. Thus, in this example, the packet can be routed from node A to node Z via nodes B, C and D, or from node A to node Z via nodes E, F and G (both of which represent an equivalent shortest path).

Figure 1B:
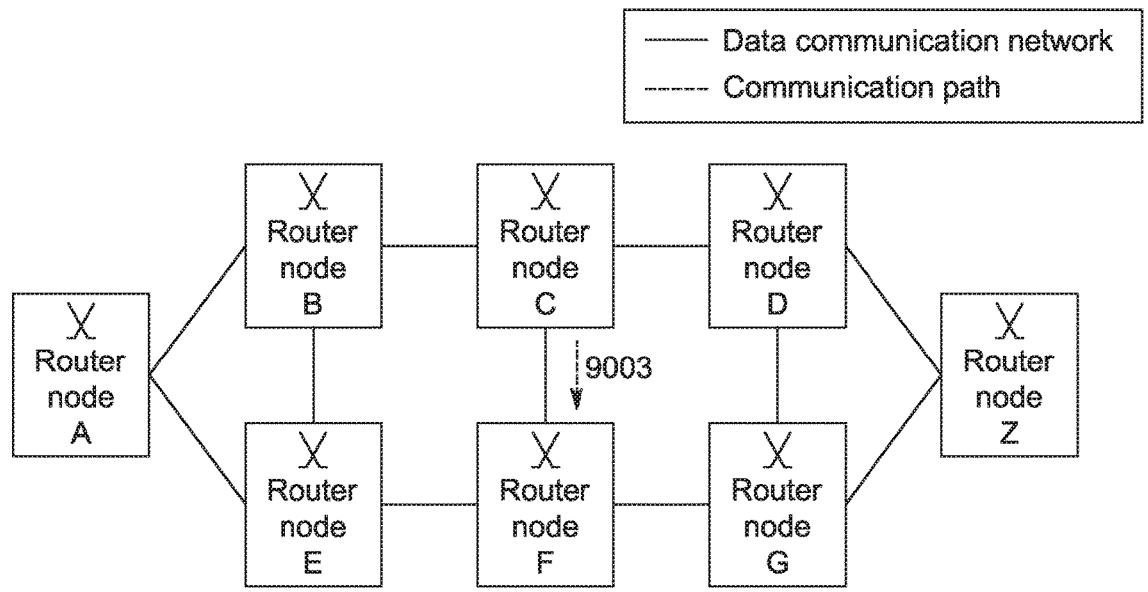
FIG. 1B illustrates an example of an adjacent segment in segment routing.

FIG. 1B illustrates an example of an adjacency node segment in segment routing. Again, the nodes A to Z are connected by a data communication network. In this example, a packet is injected into the network at node C with an active segment "9003". Previously, in this example node C will have allocated a local segment for its data link adjacency C-F. For example, C may advertise its adjacency segment in the Interior Gateway Protocol, IGP. Also in this example, it is assumed that node C is the only node to install the adjacency segment in the segment routing data plane. Thus, when a packet is injected at node C with active segment 9003, the packet is forced through the adjacent link between the nodes C and F.

Segment routing, such as node segment routing according to FIG. 1A, or adjacency segment routing according to node 1B, may be used in packet networks.

The embodiments described herein provide methods and apparatus for extending segment routing concepts also to non-packet networks, for example Optical Transport Networks (OTN), Time Division Networks (TDM) and Wavelength Division Multiplexing (WDM). Although the embodiments will be described using OTN, TDM or WDM, it is noted that the methods and apparatus may be used in any non-packet transport network.

Furthermore, as will be described in greater detail below, the embodiments consist of providing a binding between a data communication network (DCN) based on a segment routing control plane and a data plane which does not allow for the support of segment routing. Although the embodiments are focused on the example of an OTN data plane, the embodiments may be used with any data plane, for example a data plane with an Internet Protocol version 6 (IPv6) DCN.

Figure 2:
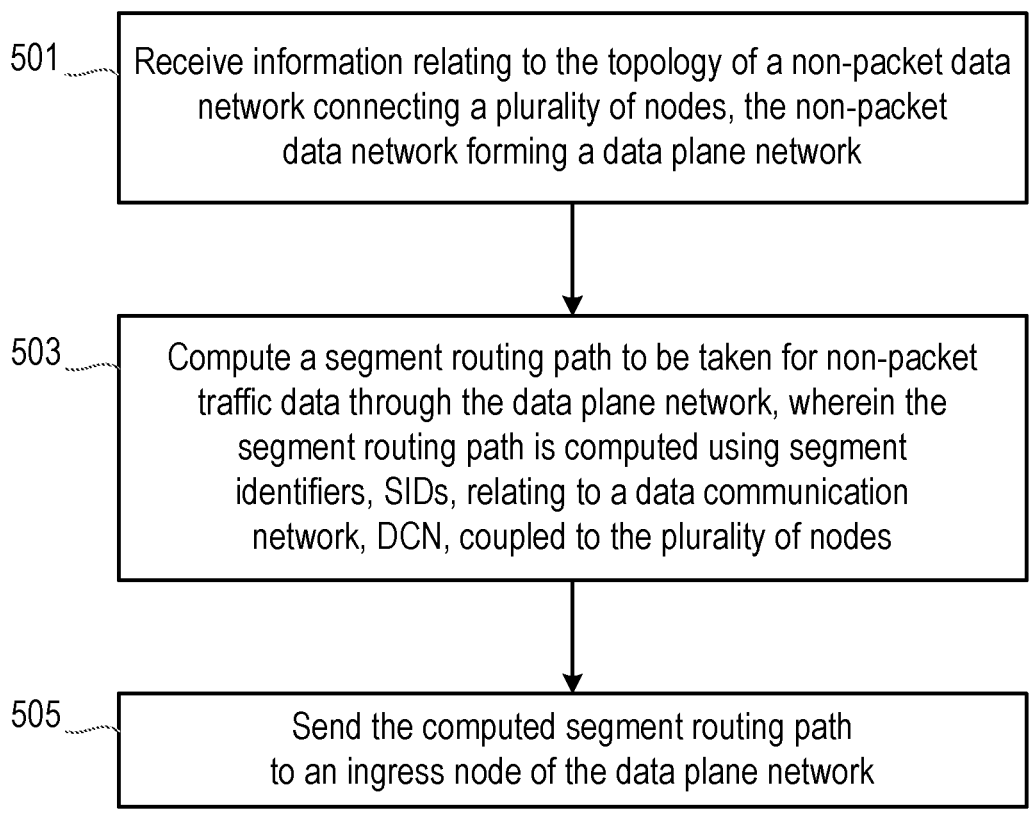
FIG. 2 shows an example of a method according to an embodiment, which may be carried out by a controller node.

FIG. 2 shows an example of a method according to a first embodiment, and in particular a method is a controller node for performing segment routing in a non-packet data network comprising a plurality of nodes (for example a method in an software defined network, SDN, controller 30 as described later in FIGS. 3 and 4).

In step 501 the method comprises receiving information relating to the topology of a non-packet data network connecting a plurality of nodes, the non-packet data network forming a data plane network.

In one example the information may comprise, for example, any of the following: information from an operator, preconfigured policy information, network availability information and/or traffic engineering capability information.

In step 503, the controller 30 computes a segment routing path to be taken for non-packet traffic data through the data plane network, wherein the segment routing path is computed using segment identifiers, SIDs, relating to a data communications network, DCN coupled to the plurality of nodes.

In one example, this computation may comprise generating a stack of segment identifiers, SIDs relating to the segment routing path.

The computation may also comprise computing a path using node segment routing and extending a segment identifier with a traffic type identifier. Alternatively, the computation may comprise computing a path using adjacent segment routing, and extending a segment identifier with a traffic type identifier and a data plane adjacency identifier.

In step 505, the method in the controller comprises sending the computed segment routing path to an ingress node of the data plane network. In one example this may comprise downloading a stack of segment identifiers, SIDs, defining a segment routing path to the ingress node. The downloading may occur, for example, using a Path Computational Element Protocol, PCEP.

In some embodiments the DCN may be configured to implement an internet protocol comprising one or more segment routing extensions, for example a DCN based on IPv6 having segment routing extensions.

In some embodiments the controller may comprise a topology database which may be populated using internet gateway protocol traffic engineering, IGP-TE.

The data plane network may be an optical transport network (OTN), or a time division multiplexing (TDM) network or a wavelength division multiplexing (WDM) network, or any other form of non-packet transport network.

Figure 3:
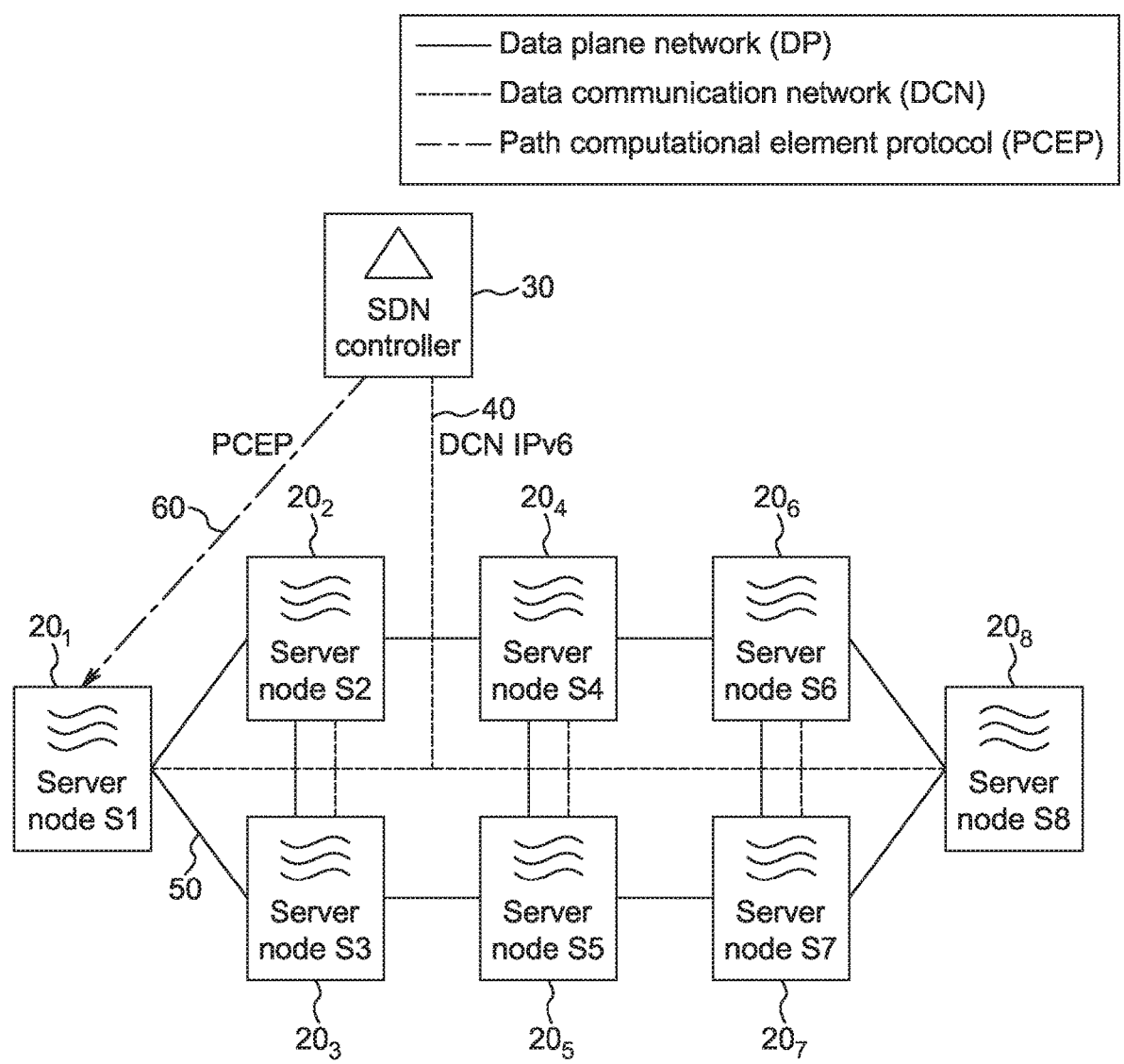
FIG. 3 illustrates an example of communication system according to an embodiment.

FIG. 3 illustrates a communication system generally indicated 200, comprising a controller node 30, for example a software defined network (SDN) controller node 30, which may be adapted to perform the method described in FIG. 2 above. The communication system 200 comprises a data communication network (DCN) 40, which is shown in the figure using dotted lines. The DCN 40 connects a plurality of nodes 20 (for example nodes $20_1$ to $20_8$ shown in the example, which are also labelled as server nodes S1 to S8). The DCN 40 may be based on IPv6 with Segment Routing (SR) extensions.

Each of the plurality of nodes 20 (transport nodes) is able to process DCN packets, for example IPv6 packets with SR extensions. However, there is no requirement to implement a packet switching capability on the plurality of nodes 20, but only have the packet processing capability at a DCN layer. The communication system 200 of this example therefore provides an IPv6 DCN for the transport nodes 20, (with such an IPv6 DCN being capable of performing DCN packet processing at software level).

The plurality of nodes 20 are also connected by a transport data plane (DP), i.e. a data plane network 50. The data plane network 50 is shown with bold lines in FIG. 3. This data plane network 50 may comprise, for example, an optical transport network (OTN) or time division multiplexing (TDM) network, or a wavelength divisional multiplexing (WDM) network.

In this example, the SDN controller 30 is connected to the ingress node $20_1$ of the DCN. The DCN is run as a segment routing control plane implementing, for example, segment routing protocols such as IGP-TE (internet gateway protocol—traffic engineering), OSPF-TE (open shortest path first—traffic engineering) or ISIS-TE (intermediate system to intermediate system—traffic engineering) with SR extensions, segment routing identifiers (SIDs), and path computational element protocol (PCEP).

The IGP-TE is used to populate a topology database of the SDN controller 30 (path computation element) with the segment identifiers (SIDs) implemented in the DCN. As such, the SDN controller 30 receives information relating to the topology of the data plane network 50 connecting the plurality of nodes 20. The SDN controller 30 is able to compute a segment routing path to be taken for non-packet traffic data through the data plane network 50, wherein the segment routing path is computed using segment identifiers, SIDs, relating to the DCN coupled to the plurality of nodes. A path computation element protocol (PCEP) may be used to download the computed segment routing path from the SDN controller 30 to the ingress node $20_1$ of the data plane network 50 (transport network). For example, a stack of labels may be sent via PCEP to the ingress node $20_1$. The stack may comprise Adjacency Segment or Node Segment as computed by the PCE of the controller.

From the above it can be seen that a binding is provided between a DCN 40 based on a segment routing control plane and a data plane (data plane network 50) which does not otherwise allow for the support of segment routing. In this way IPv6 segments are used over the transport DCN, with a binding being generated between the DCN and the transport data plane, such that the data plane is managed as if it was run by a segment routing control plane.

Figure 4:
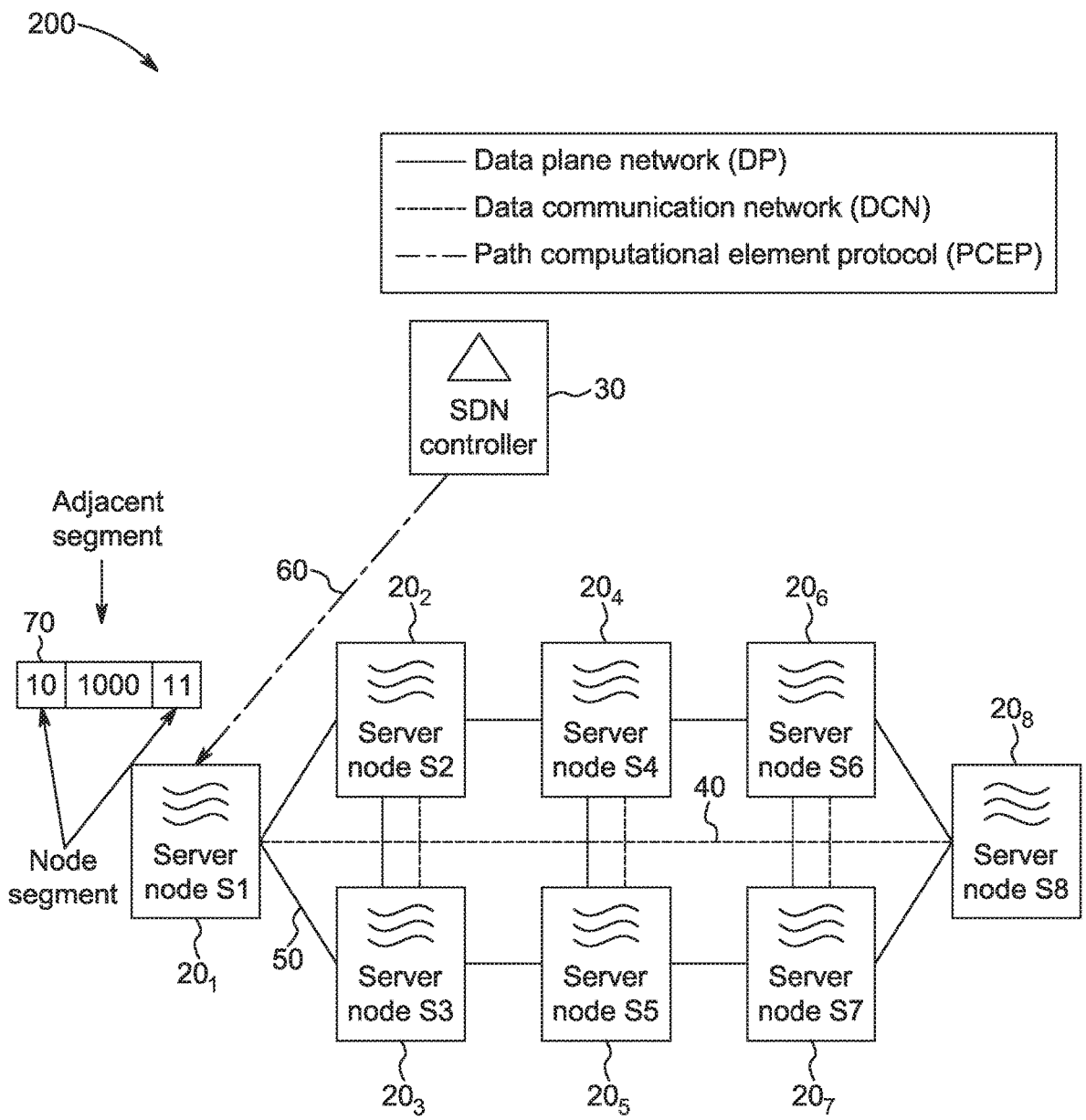
FIG. 4 illustrates an example of a communication system and a label stack computed by a controller node.

FIG. 4 illustrates a communication system generally indicated 200, similar to that of FIG. 3, which will be used to describe the use of node segment and adjacent segment routing in more detail, according to an embodiment. FIG. 4 shows an example of a label stack 70 computed by the SDN controller 30, which may be sent to an ingress node $20_1$ of the communications network 200.

This figure shows the same networks and plurality of nodes 20 as described in FIG. 3. The corresponding features have been given the same reference numerals.

In this example, the SDN controller 30 has sent a label stack 70 to the ingress node $20_1$ of the network. The label stack contains node segments "10" and "11" and an adjacent segment "1000". These segments are designed to instruct the node at which they are received which node to forward the data onto, over the data plane network 50 (but wherein the path has been computed in a control plane of the DCN 40).

In the case of a node segment, the segment identifier is extended with traffic type (e.g. ODU2, ODU1, etc.) to be carried out. The node which receives the node segment then computes the path to reach the node indicated by that particular label. It will then perform the cross-connection needed to reach the next hop with the required traffic type.

The traffic will be sent to the next hop over the data plane network 50. In some cases ECMP is used to provide the path to the next hop.

The node will also forward the unchanged label stack onto the next hop. However, this will be sent over the DCN 40.

Each node receiving a node segment may perform the same operation, regardless of whether it is an ingress node or an intermediate node.

In the case of adjacency segment, i.e. in this example "1000", the SID is extended also with a data plane adjacency identifier (ID) in addition to the traffic type (such as ODU2, ODU1, etc). A data plane adjacency ID is the reference to the interface to be used to forward the traffic on the data plane network 50 and, usually, it does not follow the OSPF path. The adjacency segment is used to steer the traffic on a configured interface.

In one example the definition of an interface can be flexible, for example defining a bundle of interface\ports, such that the node can be allowed to decide which one to use for the forwarding. In another example the definition of an interface can be more stringent, for example where traffic engineering specifies a given interface\port. Again the traffic is sent over the data plane network 50. In both cases the node may perform the required cross-connection to forward traffic to the next hop, and, as for node segment, forward on the DCN the IPv6 packet with the label stack.

Figure 5:
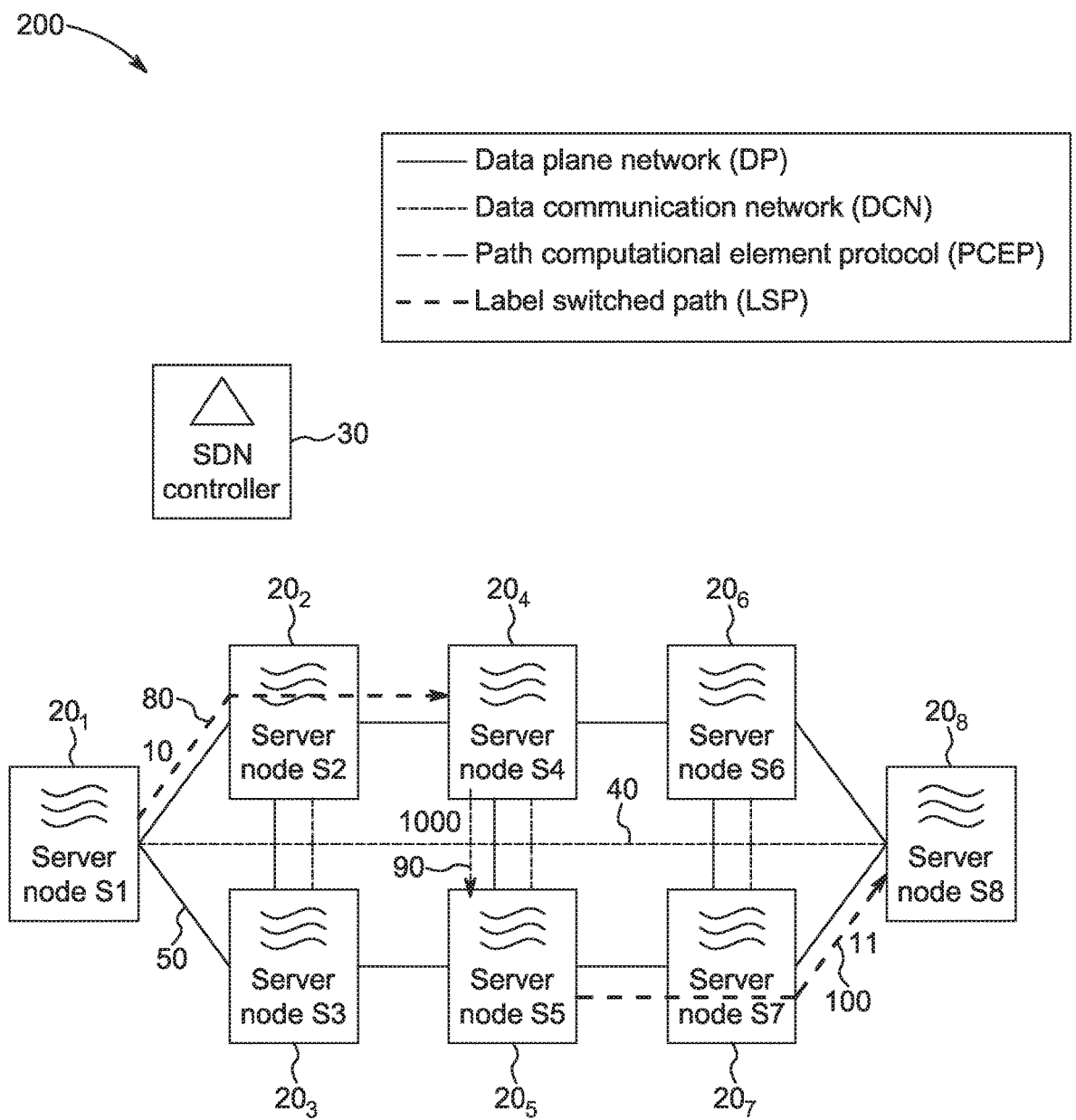
FIG. 5 illustrates an example of a communication system in which the paths to be taken by traffic data sent with the label stack of FIG. 4 are shown.

FIG. 5 illustrates a communication system generally indicated 200 in which the paths to be taken by the traffic data sent with the label stack in FIG. 4 are shown.

Again, this figure shows the same networks (DCN 40 and data plane network 50), SDN controller 30, and the plurality of nodes 20 as described in FIGS. 3 and 4. The corresponding features have been given the same reference numerals.

This is an example of the Label Switched Paths (LSP) between the nodes $20_1$ and $20_8$ built of one adjacency segment with an SID "1000" between nodes $20_4$ and $20_5$, and two node segments with SIDs "10" and "11" between nodes $20_1$ and $20_4$, and between nodes $20_5$ and $20_8$, respectively.

The ingress node $20_1$ receives the label stack, reads the external label and takes consequent actions as described below depending if it is a node or adjacency segment.

In this example, the ingress node $20_1$ reads the external label, i.e. node segment "10" which indicates that the traffic should be forwarded to the node $20_4$. The traffic therefore follows the path indicted by the arrow 80 which is calculated, in this example, by OSPF-TE. The node $20_4$ reads the adjacency segment "1000" which indicates that the traffic should be forwarded to the node $20_5$. The traffic therefore follows the path indicated by the arrow 90. Finally the node $20_5$ reads the node segment "11" which indicates that the traffic should be forwarded to the node $20_8$. The traffic therefore follows the path indicated by the arrow 100. Again, this path may be calculated by OSPF-TE.

As the traffic travels from to each node, the segment routing through the DCN may follow a standard Segment Routing implementation of stack management. In particular, the stack may drop the external label after each hop such that the next label in the stack becomes the external label representing the next hop. Alternatively, the stack may be preserved entirely, and instead a pointer may indicate a current label to be used for forwarding in a particular hop. In the latter example, the information regarding the path taken can be preserved for the entire forwarding process.

Figure 6:
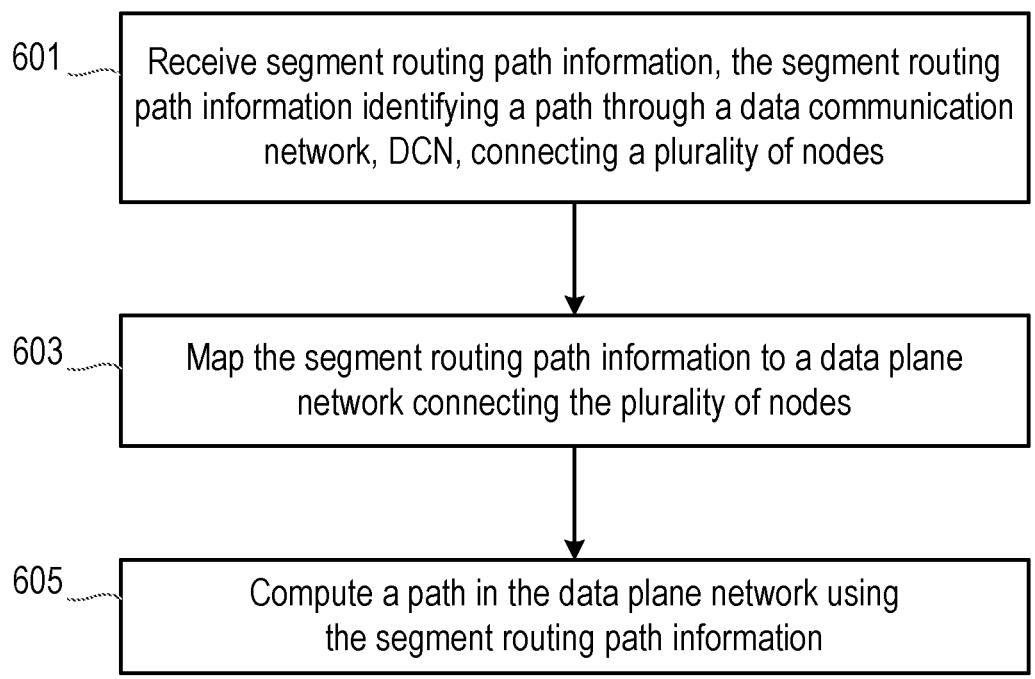
FIG. 6 shows an example of a method according to an embodiment, which may be carried out by a network node.

FIG. 6 is an example of a method according to an embodiment, for performing segment routing in a network node, the network node forming part of a non-packet data network comprising a plurality of nodes. For example, the method may be performed in any of the nodes $20_1$ to $20_8$ of FIGS. 3 to 5 above, which form part of a data plane network 50 (and which are coupled to a DCN 40).

In step 601, the method comprises receiving segment routing path information, the segment routing path information identifying a path through a data communications network, DCN, connecting a plurality of nodes.

It is noted that the segment routing path information may comprise node segments and/or adjacency segments as described previously. In particular, the segment routing path information may be an SID label stack identifying a path through the data communication network, DCN connecting the nodes.

In step 603, the method comprises mapping the segment routing path information to a data plane network connecting the plurality of nodes. In this way there is a form of binding between the control plane of the DCN and the data plane of the non-packet network.

In step 605, the method comprises computing a path in the data plane network using the segment routing path information.

If the segment routing path information is an SID label stack, this computation may involve mapping the SID label stack to the data plane network and then computing the path through the data plane network.

Thus, in such an example, the method performed in the network node may comprise receiving a segment identifier, SID, label stack, the SID label stack identifying a path through the data communication network, DCN, connecting the plurality of nodes, and mapping the SID label stack to the data plane network connecting the network of nodes. The method further comprises computing the path indicated by the SID label stack through the data plane network.

In an example where the segment routing path is computed using a node segment format, the method may comprise: receiving a segment identifier, SID, label stack; reading an external label of SID label stack, wherein the external label has been extended with a traffic type identifier; computing a path to reach a node indicated in the external label, by performing a cross connection needed to reach the next hop with the required traffic type; and forwarding traffic data with an unchanged label stack to the next hop on the data communication network.

In an example where the segment routing path is computed using an adjacent segment format, the method may comprise: receiving a segment identifier, SID, label stack; reading an external label of SID label stack, wherein the external label has been extended with a traffic type identifier and a data plane adjacency identifier; computing a path to reach a node indicated in the external label, by performing a cross connection needed to reach the next hop with the required traffic type; and forwarding traffic data with the label stack to the next hop on the data communication network.

The data plane adjacency identifier provides a reference to an interface to be used to forward the traffic on the data plane network.

It is noted that when such an adjacent segment is used, the adjacency SID may be dropped when forwarding the traffic data to the next hop.

In one example, the interface may comprise a bundle of interfaces or ports, and wherein the network node is configured to decide which interface or port is to be used for forwarding. This has an advantage of providing greater flexibility, by allowing the network node itself to decide which interface/port to use.

In another example, the interface comprises an interface or port that is pre-specified, for example an interface or port that is pre-specified using a traffic engineering protocol.

It will be appreciated that the node which carries out the method described in FIG. 6 may be an ingress node of the network or an intermediate node. If the node is an ingress node then in step 601 the segment routing path information is received from a controller. Alternatively, if the node is an intermediate node of the network, such as nodes $20_2$ to $20_7$ then the segment routing path information is received from the previous node in the chain.

Figure 7:
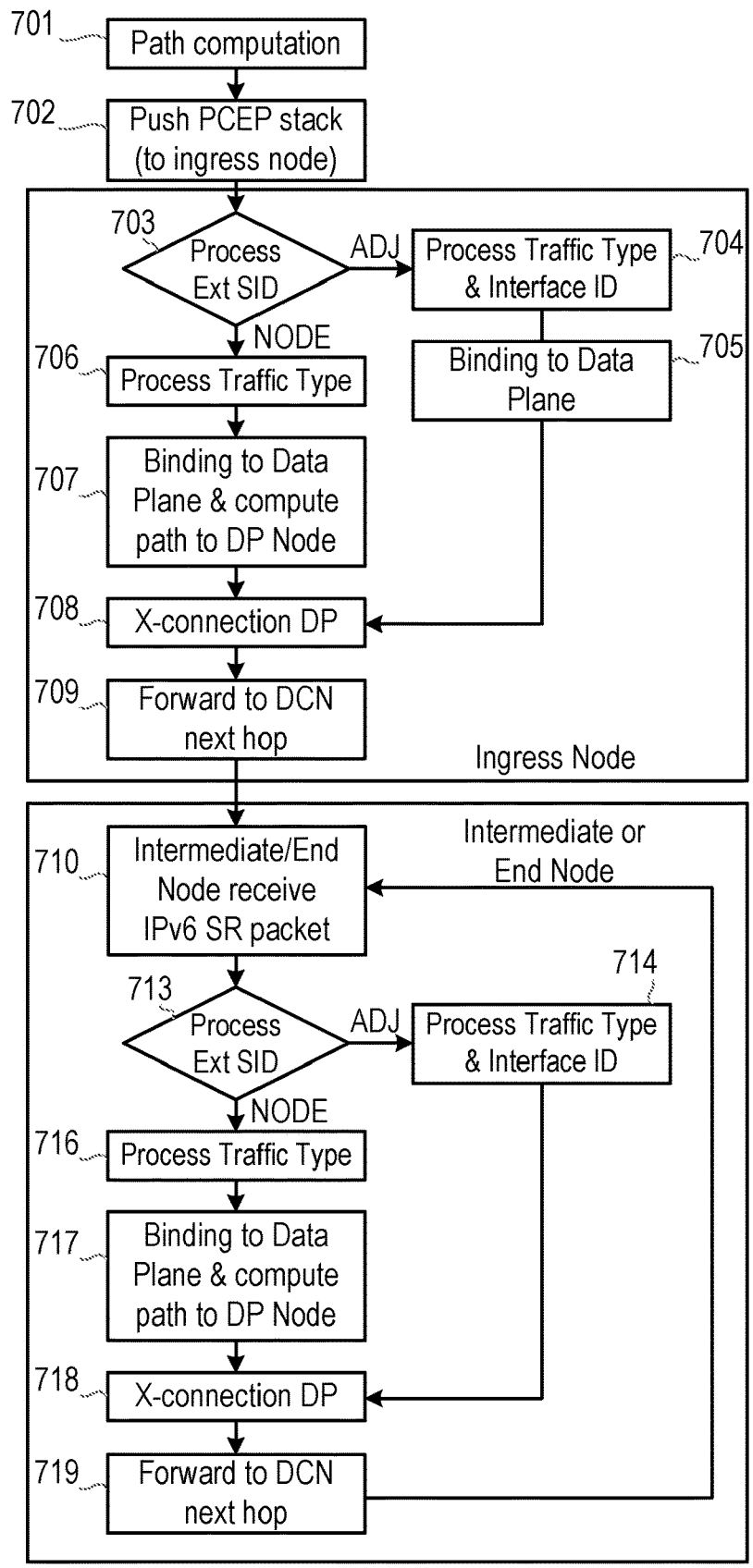
FIG. 7 shows an example of a method which may be carried out in a controller node, an ingress node and an intermediate node of a network, according to an embodiment.

FIG. 7 is a more detailed flow chart of a method which may be carried out in an SDN controller, an ingress node and an intermediate node of a network.

In step 701 path computation is performed. In some examples, this path computation takes place in an SDN controller 30.

In step 702, a path computation element protocol (PCEP) stack comprising information relating to the segment routing path for particular data traffic is pushed to the ingress node of the communication network. In particular the PCEP stack may comprise a stack of SIDs associated with a particular path through the communication network.

Steps 703 to 709 illustrate a method carried out by the ingress node of the communication network.

In step 703 the ingress node receives the PCEP stack and processes the external SIDs in the PCEP stack. If the SID is an adjacent segment the method passes to step 704 where the traffic type and interface identification are processed, as determined from the PCEP stack. The PCEP stack routing identifier is then mapped to the data plane in step 705 (which effectively binds the route determined in the control plane of a DCN to a path to be followed in a data plane network).

The process then passes to step 708 where a cross-connection is made according to the information provided in the traffic field type, and the interface indicated in the PCEP stack. In some examples there may be a bundle of interfaces indicated in the PCEP stack, in this case only one of these interfaces is selected. The packet is then forwarded to the next hop.

In step 703, if it is determined that the SID is a node segment, the method passes to step 706 where the traffic type information is processed, as determined from the PCEP stack. The PCEP stack routing identifier is then mapped to the data plane in step 707, and the path to the data plane node is computed. In some embodiments this path is computed by using OSPF-TE.

The process then passes to step 708 where a cross-connection is made according to the determined paths. In step 709 the node forwards the packet (including the PCEP stack containing the SID labels) to the next hop indicated by the DCN.

The steps 710 to 719 describe a method which may be carried out in an intermediate or end node of the communication network.

In step 710, the intermediate node receives a segment routing (SR) packet from the previous node.

In step 713, the node processes the external SID in the label (e.g. PCEP) stack. If the SID is an adjacent segment the method passes to step 714 where the traffic type and interface identification are processed, as determined from the PCEP stack. The PCEP stack routing identifier is then mapped to the data plane network, and the process then passes to step 718 where a cross-connection is made according to the information provided in the traffic field type, and the interface indicated in the PCEP stack. In some examples there may be a bundle of interfaces indicated in the PCEP stack, in this case only one of these interfaces is selected.

If it is determined in step 713 that the external SID is a node segment, the method passes to step 716 where the traffic type is processed, as determined from the PCEP stack. The PCEP stack routing identifier is then mapped (binding) to the data plane in step 717 and the path to the data plane node is computed. In some embodiments this path is computed by using OSPF-TE. The process then passes to step 718 where a cross-connection is made according to the determined paths.

In step 719 the node forwards the packet (including the PCEP stack containing the SID labels) to the next hop, as indicated by the DCN network.

Figure 8:
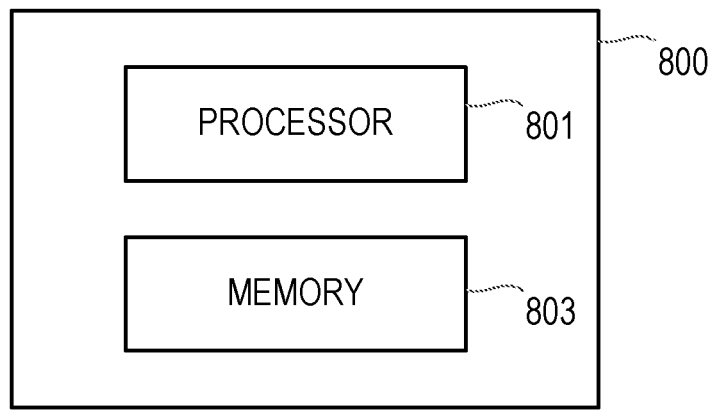
FIG. 8 illustrates an example of a controller node according to an embodiment.

FIG. 8 is a block diagram showing a controller node 800 according to an embodiment, for performing segment routing in a non-packet data network comprising a plurality of nodes.

The controller node 800 comprises a processor 801 and a memory 803. The memory 803 contains instructions executable by said processor 801. The controller node 800 is operative to receive information relating to the topology of the non-packet data network connecting the plurality of nodes, the non-packet network forming a data plane network. The controller node 800 is also operative to compute a segment routing path to be taken for non-packet traffic data through the data plane network, wherein the segment routing path is computed using segment identifiers, SIDs, relating to a data communication network, DCN, coupled to the plurality of nodes. The controller node 800 is further operative to send the computed segment routing path to an ingress node of the data plane network.

It is noted that the controller node may be further operative to perform any of the method steps described herein for a controller node.

Figure 9:
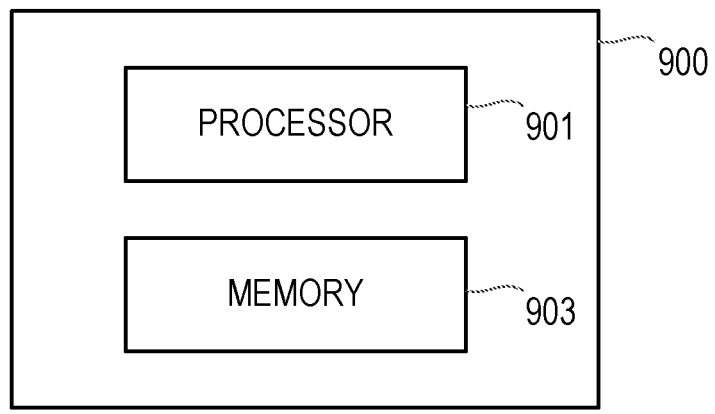
FIG. 9 illustrates an example of a network node according to an embodiment.

FIG. 9 illustrates a network node 900 according to an embodiment, for performing segment routing. The network node 900 may form part of a non-packet data network comprising a plurality of nodes. The network node 900 comprises a processor 901 and memory 903, the memory 903 containing instructions executable by the processor 901. The network node 900 is operative to receive segment routing path information, the segment routing path information identifying a path through a data communication network, DCN, connecting the plurality of nodes. The network node 900 is further operative to map the segment routing path information to a data plane network connecting the plurality of nodes. The network node 900 is further operative to compute a path in the data plane network using the segment routing path information.

It is noted that the network node may be further operative to perform any of the method steps described herein for a network node.

Figure 10:
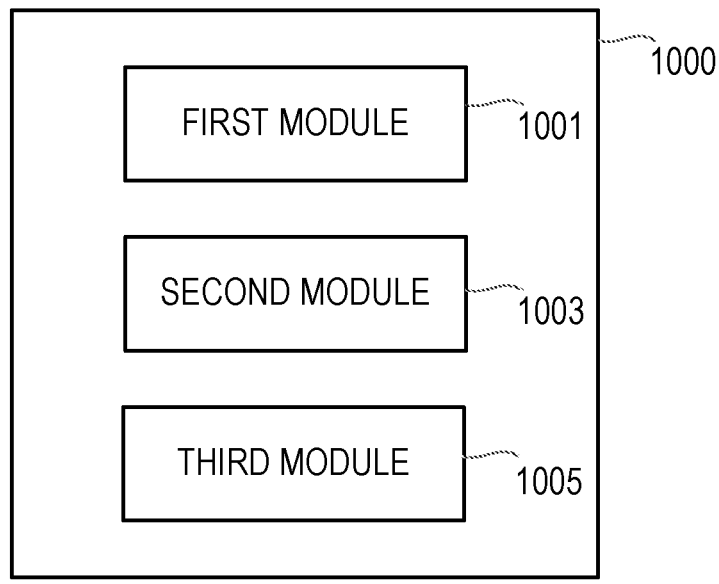
FIG. 10 illustrates another example of a controller node according to an embodiment, for performing segment routing.

FIG. 10 illustrates a controller node 1000 according to another embodiment, for performing segment routing in a non-packet data network comprising a plurality of nodes. The controller node 1000 comprises a first module 1001 configured to receive information relating to the topology of the non-packet data network connecting the plurality of nodes, the non-packet network forming a data plane network. The controller node 1000 further comprises a second module 1003 configured to compute a segment routing path to be taken for non-packet traffic data through the data plane network, wherein the segment routing path is computed using segment identifiers, SIDs, relating to a data communication network, DCN, coupled to the plurality of nodes. The controller node 1000 further comprises a third module 1005 configured to send the computed segment routing path to an ingress node of the data plane network.

Figure 11:
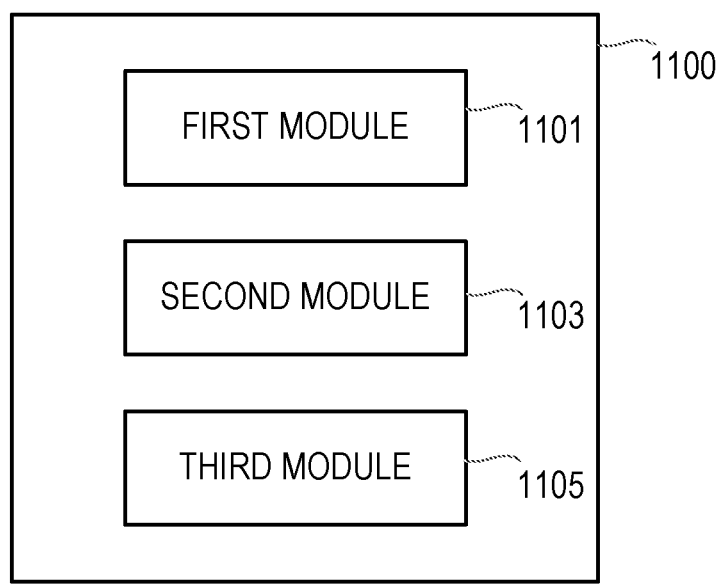
FIG. 11 illustrates another example of a network node according to an embodiment, for performing segment routing.

FIG. 11 illustrates a network node 1100 according to another embodiment, for performing segment routing. The network node 1100 may form part of a non-packet data network comprising a plurality of nodes. The network node 1100 comprises a first module 1101 configured to receive segment routing path information, the segment routing path information identifying a path through a data communication network, DCN, connecting the plurality of nodes. The network node 900 further comprises a second module 1103 configured to map the segment routing path information to a data plane network connecting the plurality of nodes. The network node 1100 further comprises a third module 1105 configured to compute a path in the data plane network using the segment routing path information.

According to another embodiment, there is provided a computer program product having computer readable code embodied therein. The computer readable code is configured such that, on execution by a suitable computer or processor, the computer or processor performs the method as described herein, and as defined in the appended claims.

From the embodiments described above, it can be seen that the possibility of using a segment routing paradigm also in non-packet networks allows the disadvantages related to a fully distributed or a fully centralized control plane to be avoided. In other words, it is possible not to rely on the connectivity between nodes and SDN controller for recovery and not to deal with the complexity and the scalability issues of distributed signaling protocols. This allows for significant operation expense (OpEx) savings when operating transport networks, and increases the degree of resiliency.

The use of segment routing in the embodiments described above also allows Traffic Engineering (TE) mechanisms to be used in embodiments comprising non-packet networks.

The embodiments described herein take advantage of various aspects for enabling segment routing to be used in a non-packet transport network. For example, the embodiments may utilize a DCN based on IPv6 with SR extensions, as defined in the Internet Engineering Task Force specification version three, "https://tools.ietf.org/html/draft-ietf-spring-segment-routing-03". In one example there is no need to further extend this, but apply it to the DCN infrastructure instead of the data plane. The embodiments may also take advantage of transport nodes being able to process IPv6 packets with SR extensions. There is no need to implement a packet switching capability on the transport nodes, but merely have the packet processing capability at the DCN layer. The evolution towards an IPv6 DCN for transport nodes is increasing, and DCN packet processing is usually perform at software level.

The embodiments may also take advantage of OSPF-TE running in the transport network. OSPF-TE can be used to feed the centralized PCE (e.g. hosted into the SDN controller) with the topology, network availability and TE capabilities. The embodiments may also take advantage of a SDN controller with PCEP. The SDN controller is able to compute paths based on the OSPF-TE information and the inputs from an operator (or pre-configured policies). Such paths may be encoded as IPv6 Segments and pushed to the ingress node, e.g. via PCEP (which is an example way of pushing segments in segment routing).

The embodiments described herein provide a binding of packet DCN messages (e.g. IPv6 messages with Segment Routing enabled) with a non-packet transport data plane. This allows the implementation of the Segment Routing paradigm in networks that by nature are not able to support Segment Routing. The embodiments also define extensions to IPv6 segment routing, namely "traffic type" and "data plane adjacency ID" used to identify the data plane resources to be used to forward the traffic.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method in a controller node for performing segment routing in a non-packet data network comprising a plurality of nodes, the method comprising:
   receiving information relating to a topology of the non-packet data network connecting the plurality of nodes, the non-packet data network forming a data plane network;
   computing a segment routing path to be taken for non-packet traffic data through the data plane network, wherein the segment routing path is computed using segment identifiers (SIDs) relating to a data communication network (DCN) coupled to the plurality of nodes, wherein the segment routing path is computed in a control plane of the DCN, wherein the segment routing path is further computed by using adjacent segment routing for at least one adjacent segment and extending a segment identifier with a traffic type identifier and a data plane adjacency identifier, wherein the data plane adjacency identifier provides a reference to an interface to be used to forward traffic data on the data plane network, and wherein the interface is selected from a bundle of interfaces, indicated in a path computation element protocol (PCEP) stack, based on an external SID indicated in the PCEP stack; and
   sending the computed segment routing path to an ingress node of the data plane network.

2. The method as claimed in claim 1, wherein the path computation procedure comprises an open shortest path first, traffic engineering (OSPF-TE) procedure.

3. The method as claimed in claim 1, wherein the step of receiving the information comprises receiving one or more of the following inputs:
   information from an operator;
   preconfigured policy information;
   network availability information; and
   traffic engineering capability information.

4. The method as claimed in claim 1, wherein the computing step further comprises generating a stack of segment identifiers (SIDs) relating to the segment routing path.

5. The method as claimed in claim 1, wherein the sending step comprises downloading a stack of SIDs defining a segment routing path to the ingress node.

6. The method as claimed in claim 5, wherein the sending step further comprises downloading the stack of SIDs using the PCEP.

7. The method as claimed in claim 1, wherein the DCN is configured to implement an internet protocol comprising one or more segment routing extensions.

8. The method as claimed in claim 1, further comprising a step of populating a topology database in the controller node using interior gateway protocol traffic engineering (IGP-TE).

9. The method as claimed in claim 1, wherein the data plane network comprises an optical transport network (OTN), a time division multiplexing (TDM) network, or a wavelength division multiplexing (WDM) network.

10. A method for performing segment routing in a network node, the network node forming a part of a non-packet data network comprising a plurality of nodes, the method comprising:
    receiving segment routing path information, the segment routing path information identifying a path through a data communication network (DCN) connecting the plurality of nodes, wherein the segment routing path information is a segment identifier (SID) label stack identifying a path through the DCN connecting the plurality of nodes, wherein the segment routing path is computed in a control plane of the DCN, wherein the segment routing path information is further computed by using adjacent segment routing for at least one adjacent segment and extending an external label of the SID label stack with a traffic type identifier and a data plane adjacency identifier, wherein the data plane adjacency identifier provides a reference to an interface to be used to forward traffic data on a data plane network connecting the plurality of nodes, and wherein the interface is selected from a bundle of interfaces, indicated in the SID label stack, based on an external SID indicated in the SID label stack;
    mapping the segment routing path information to the data plane network connecting the plurality of nodes; and
    computing a path in the data plane network using the segment routing path information.

11. The method as claimed in claim 10, further comprising:
    mapping the SID label stack to the data plane network connecting the plurality of nodes; and
    computing the path indicated by the SID label stack through the data plane network.

12. The method as claimed in claim 10, wherein the segment routing path information is computed using an adjacent segment format, and wherein the method comprises:
    reading the external label of SID label stack;
    computing a path to reach a node indicated in the external label, by performing a cross connection needed to reach a next hop with the traffic type identifier; and
    forwarding the traffic data with the SID label stack to the next hop on the data communication network.

13. The method as claimed in claim 10, wherein the interface comprises a bundle of interfaces or ports.

14. The method as claimed in claim 10, wherein the interface comprises an interface or a port that is pre-specified.

15. The method as claimed in claim 14, wherein the interface or the port is pre-specified using a traffic engineering protocol.

16. A controller node for performing segment routing in a non-packet data network comprising: a processor and a memory, said non-packet data network comprising a plurality of nodes, said memory containing instructions executable by said processor, whereby said controller node is operative to:
    receive information relating to a topology of the non-packet data network connecting the plurality of nodes, the non-packet network forming a data plane network;
    compute a segment routing path to be taken for non-packet traffic data through the data plane network, wherein the segment routing path is computed using segment identifiers (SIDs), relating to a data communication network (DCN) coupled to the plurality of nodes, wherein the segment routing path is computed in a control plane of the DCN, wherein the segment routing path is further computed by use of adjacent segment routing for at least one adjacent segment and extending a segment identifier with a traffic type identifier and a data plane adjacency identifier, wherein the data plane adjacency identifier provides a reference to an interface to be used to forward traffic data on the data plane network, and wherein the interface is selected from a bundle of interfaces, indicated in a path computation element protocol (PCEP) stack, based on an external SID indicated in the PCEP stack; and send the computed segment routing path to an ingress node of the data plane network.

17. A network node for performing segment routing, the network node forming part of a non-packet data network comprising: a processor and a memory, said non-packet data network comprising a plurality of nodes, said memory containing instructions executable by said processor, whereby said network node is operative to:

receive segment routing path information, the segment routing path information identifying a path through a data communication network (DCN) connecting the plurality of nodes, wherein the segment routing path information is a segment identifier (SID) label stack that identifies a path through the DCN connecting the plurality of nodes, wherein the segment routing path is computed in a control plane of the DCN, wherein the segment routing path information is further computed by use of adjacent segment routing for at least one adjacent segment and extending an external label of the SID label stack with a traffic type identifier and a data plane adjacency identifier, wherein the data plane adjacency identifier provides a reference to an interface to be used to forward traffic data on a data plane network connecting the plurality of nodes, and wherein the interface is selected from a bundle of interfaces, indicated in the SID label stack, based on an external SID indicated in the SID label stack;

map the segment routing path information to the data plane network connecting the plurality of nodes; and compute a path in the data plane network using the segment routing path information.

18. A non-transitory computer-readable storage medium comprising a computer program product including instructions to cause at least one processor to:

receive information relating to a topology of a non-packet data network connecting a plurality of nodes, the non-packet data network forming a data plane network;

compute a segment routing path to be taken for non-packet traffic data through the data plane network, wherein the segment routing path is computed using segment identifiers (SIDs) relating to a data communication network (DCN) coupled to the plurality of nodes, wherein the segment routing path is computed in a control plane of the DCN, wherein the segment routing path is further computed by the at least one processor using adjacent segment routing for at least one adjacent segment and extending a segment identifier with a traffic type identifier and a data plane adjacency identifier, wherein the data plane adjacency identifier provides a reference to an interface to be used to forward traffic data on the data plane network, and wherein the interface is selected from a bundle of interfaces, indicated in a path computation element protocol (PCEP) stack, based on an external SID indicated in the PCEP stack; and send the computed segment routing path to an ingress node of the data plane network.

* * * * *